US008668178B2

(12) United States Patent
Ziaylek et al.

(10) Patent No.: US 8,668,178 B2
(45) Date of Patent: Mar. 11, 2014

(54) BRACKET FOR RETAINING CYLINDRICAL TANK VERTICALLY UPRIGHT

(75) Inventors: Michael P. Ziaylek, Yardley, PA (US); W. Brian McGinty, Huntingdon Valley, PA (US)

(73) Assignee: Michael P. Ziaylek, Yardley, PA (US)

( * ) Notice: Subject to any disclaimer, the term of this patent is extended or adjusted under 35 U.S.C. 154(b) by 0 days.

(21) Appl. No.: 13/385,261

(22) Filed: Feb. 10, 2012

(65) Prior Publication Data

US 2012/0286120 A1 Nov. 15, 2012

Related U.S. Application Data

(60) Provisional application No. 61/518,710, filed on May 10, 2011.

(51) Int. Cl.

| | |
|---|---|
| ***A47K 1/08*** | (2006.01) |
| *A47F 5/00* | (2006.01) |
| *A47G 1/10* | (2006.01) |
| *B60R 7/00* | (2006.01) |
| *B60R 9/00* | (2006.01) |
| *B60R 11/00* | (2006.01) |

(52) U.S. Cl.
USPC ..................... 248/312; 248/309.1; 248/311.2; 248/316.2; 224/570

(58) Field of Classification Search
USPC ......................... 248/311.2, 312, 312.1, 176.1
See application file for complete search history.

(56) References Cited

U.S. PATENT DOCUMENTS 2,168,136 A 8/1939 Playfair et al.
3,224,720 A 12/1965 Hain
3,317,171 A 5/1967 Kramer
3,565,384 A 2/1971 Lockwood
3,765,635 A 10/1973 Burrell et al.
4,213,592 A 7/1980 Lingenfelser
D267,227 S 12/1982 Ziaylek, Jr.
4,606,521 A 8/1986 Williams
4,997,157 A 3/1991 Sweeny
5,297,890 A 3/1994 Commins
5,318,266 A 6/1994 Liu
5,423,508 A 6/1995 Isenga et al.
D394,381 S 5/1998 Ziaylek, Jr. et al.
5,890,544 A 4/1999 Love et al.
6,059,245 A 5/2000 Hermansen et al.
6,095,471 A * 8/2000 Huang ....................... 248/311.2
6,138,768 A 10/2000 Fujiki
D434,495 S 11/2000 Whalen et al.
6,431,516 B1 * 8/2002 Cooner et al. ................ 248/551
6,601,923 B2 8/2003 Pond et al.

(Continued)

*Primary Examiner* — Jonathan Liu
*Assistant Examiner* — Taylor Morris
(74) *Attorney, Agent, or Firm* — Sperry, Zoda & Kane

(57) ABSTRACT

A bracket construction for fixedly securing a cylindrical tank such as the oxygen tank of an emergency vehicle in a vertically upright position wherein the tank is easily releasable which accommodates various sizes and configurations of upper neck sections having a backing plate with a lower surrounding member for receiving and retaining the tank bottom therewithin and an upper surrounding member including a U-shaped channel for receiving the tank neck therewithin. Two uniquely shaped bracket cams are pivotally mounted relative to the upper surrounding member and resiliently biased with respect thereto such that they can be manually manipulated or directly contacted by the arcuate neck of a tank to move to the opened position to allow exiting or entry of the tank. A lower auxiliary floor surface is pivotally secured relative to the lower surrounding member for varying the vertical dimension for accommodating tanks of various lengths and shapes.

18 Claims, 11 Drawing Sheets

(56) References Cited

U.S. PATENT DOCUMENTS

| | | | | |
|---|---|---|---|---|
| 6,926,243 | B1 * | 8/2005 | Ziaylek et al. | 248/307 |
| D545,003 | S | 6/2007 | Heerdt et al. | |
| D562,116 | S | 2/2008 | Ziaylek et al. | |
| 7,455,268 | B2 | 11/2008 | Heath | |
| 7,878,472 | B2 | 2/2011 | Lackore | |
| 2007/0187414 | A1 | 8/2007 | Lackore | |
| 2007/0292249 | A1 | 12/2007 | Wilson | |
| 2008/0128464 | A1 * | 6/2008 | Gale et al. | 224/570 |
| 2009/0250582 | A1 * | 10/2009 | Ziaylek | 248/312 |
| 2010/0219220 | A1 | 9/2010 | Bostrom et al. | |

* cited by examiner

BRACKET FOR RETAINING CYLINDRICAL TANK VERTICALLY UPRIGHT

The present utility application hereby formally claims priority of U.S. Provisional Patent application No. 61/518,710 filed May 10, 2011 on "BRACKET FOR RETAINING CYLINDRICAL TANK VERTICALLY UPRIGHT" filed by the same inventors listed herein, namely, Michael P. Ziaylek of Yardley Pa. and W. Brian McGinty of Huntington Valley Pa. and assigned to Michael P. Ziaylek of Yardley Pa., said referenced provisional application being hereby formally incorporated by reference as an integral part of the present application.

BACKGROUND OF THE INVENTION

1. Field of the Invention

The present invention deals with the field of devices for holding tanks commonly used in emergency vehicles such as ambulances wherein the tanks commonly will contain oxygen or other gases required during emergency operations. Such brackets need to be capable of being mounted with respect to environmental structure such as the interior of the emergency vehicle such as an ambulance or fire truck for firmly securing the tank therewithin and preventing movement of the tank during movement of the vehicle itself to minimize dangers to personnel located within the vehicle.

Such devices need to include a firm means for securing of the tanks within the bracket as well as facilitating quick and easy removal thereof under the conditions of common emergencies. Such tanks come in various sizes and shapes, lengths and neck dimensions and, as such, it is preferable that such brackets accommodate tanks which vary in these sizes and dimensions.

2. Description of the Prior Art

Other brackets for similar use are disclosed in U.S. Pat. No. 2,168,136 patented Aug. 1, 1939 to A. F. Playfair et al on a "Fire Extinguishing Bomb And Bracket Therefor" and assigned to George W. F. Brishin and Annie F. Playfair; and U.S. Pat. No. 3,224,720 patented Dec. 21, 1965 to C. L. Hain and assigned to The Fire Guard Corporation on a "Combined Handle Lock And Bracket For Fire Extinguishers"; and U.S. Pat. No. 3,317,171 patented May 2, 1967 to J. Kramer on a "Cup Or Tumbler Holder For Attachment To Aluminum Chairs Or The Like"; and U.S. Pat. No. 3,565,384 patented Feb. 23, 1971 to L. A. Lockwood and assigned to Bernzomatic Corporation on a "Bracket For Holding And Clamping Gas Cylinder Type Fire Extinguisher Tanks"; and U.S. Pat. No. 3,765,635 patented Oct. 16, 1973 to W. R. Burrell et al and assigned to Burrell Bros., Inc. on a "Bracket For Gas Containers And Similar Tanks"; and U.S. Pat. No. 4,213,592 patented Jul. 22, 1980 to D. J. Lingenfelser and assigned Caterpillar Tractor Co. on a "Bracket Assembly For Mounting Fire Extinguishers Thereon"; and U.S. Pat. No. 4,606,521 patented Aug. 19, 1986 to G. R. Williams on a "Cylinder Holder"; and U.S. Pat. No. 4,997,157 patented Mar. 5, 1991 to H. D. Sweeny and assigned to Swenco Limited on a "Multi-Purpose Canister Wall Bracket"; and U.S. Pat. No. 5,297,890 patented Mar. 29, 1994 to A. D. Commins and assigned to Simpson Strong-Tie Company, Inc. on a "Wood-To-Pipe Connection"; and U.S. Pat. No. 5,318,266 patented Jun. 7, 1994 to H. L. Liu on a "Drink Holder"; and U.S. Pat. No. 5,423,508 patented Jun. 13, 1995 to S. R. Isenga et al and assigned to ITC, Incorporated on a "Foldable Support For Beverage Container"; and U.S. Pat. No. 5,890,544 patented Apr. 6, 1999 to R. Love et al on a "Self-Contained Remote Automated Fire Suppression"; and U.S. Pat. No. 6,059,245 patented May 9, 2000 to F. Hermansen et al on a "Locking Water Bottle Cage For Bicycles"; and U.S. Pat. No. 6,138,768 patented Oct. 31, 2000 to M. Fujiki and assigned to Masaru Fujiki; Shichifuku Co., Ltd. on a "Gas Type Fire Extinguisher"; and U.S. Pat. No. 6,601,923 patented Aug. 5, 2003 to G. Pond et al and assigned to Seats Incorporated on an "Emergency Vehicle Seat With Integrated Seat Belt"; and U.S. Pat. No. 7,455,268 patented Nov. 25, 2008 to R. W. Heath and assigned to Nibco, Inc. on a "Hanger For Fire Sprinkler Pipe"; and U.S. Pat. No. 7,878,472 patented Feb. 1, 2011 to J. R. Lackore and assigned to Pierce Manufacturing Inc. on an "Auto-Locking Holder Apparatus"; and U.S. Design Pat. No. D394,381 patented May 19, 1998 to T. Ziaylek, Jr. et al on a "Tank Bracket"; and U.S. Design Pat. No. D434,495 patented Nov. 28, 2000 to L. U J. Whalen et al and assigned to Wheeled Coach Industries, Inc. on an "Oxygen Bottle Holder"; and U.S. Design Pat. No. D545,003 patented Jun. 19, 2007 to D. G. Heerdt et al and assigned to Walter Kidde Portable Equipment on a "Fire Extinguisher Bracket"; and U.S. Design Pat. No. D562,116 patented Feb. 19, 2008 to M. P. Ziaylek et al on a "Bracket For Releasably Retaining An Inverted Tank"; and United States Publication No. 2007/0187414 published Aug. 16, 2007 to J. R. Lackore and assigned to Pierce Manufacturing Inc. on a "Tank Holder For A Vehicle"; and United States Publication No. 2010/0219220 published Sep. 2, 2010 to P. C. Bostrom et al and assigned to H.O. Bostrom Company, Inc. on an "Automatic Locking SCBA Mounting Bracket Assembly".

SUMMARY OF THE INVENTION

The present invention provides a unique bracket for retaining a cylindrical tank in a vertically upright position. Included is a backing plate which extends generally vertically and is capable of mounting to adjacent environmental structure.

Included is a lower surrounding member secured to the backing plate which extends outwardly therefrom and defines a lower retaining cavity which is adapted to receive and selectively retain a bottom of a cylindrical tank. The lower surrounding member will preferably define a lower surrounding member floor surface for positioning of the lower portion of the cylindrical tank thereon. An upper surrounding member is also included secured to the backing plate which extends outwardly therefrom at a position spatially disposed upwardly from the lower surrounding member for the purpose of retaining the neck of a cylindrical tank therein. The upper surrounding member preferably defines an upper retaining channel oriented facing outwardly therefrom in a direction away from the backing plate. This upper surrounding member further defines an upper retaining opening for facilitating entry into and exiting from the upper retaining channel. It is located at a position spatially disposed from the backing plate. The lower surrounding member and the upper retaining channel of the upper surrounding member will define a tank retaining zone extending therealong between the backing plate for selectively holding a cylindrical tank therein.

A uniquely configured retaining apparatus is included positioned adjacent to the upper retaining opening and attached to the upper surrounding member which cooperates to selectively retain the neck of a cylindrical tank within the upper retaining channel to facilitate selective retaining of it within the tank receiving zone. The retaining apparatus includes a first bracket cam pivotally movably mounted to the upper surrounding member adjacent the upper retaining opening. This first bracket cam is pivotally movable to a closed position extending at least partially across the upper retaining opening to facilitate retaining of a cylindrical tank within the upper retaining channel and it is also pivotally movable to an opened position at least partially removed from the upper retaining opening to allow movement of a tank neck through the upper retaining opening into and/or out of the upper retaining channel to allow convenient replacement and/or removal of the tank from the tank retaining zone. This first bracket cam includes a first cam protruding section which is extendable into the upper retaining opening responsive to the first bracket cam being positioned in the closed position. It also includes a first cam inner abutment surface facing generally inwardly toward the upper retaining channel responsive to the first bracket cam being positioned in the closed position for abutting a tank neck positioned therewithin to facilitate securement thereof within the tank retaining zone. The first bracket cam further includes a first cam outer abutment surface facing generally outwardly away from the upper retaining channel responsive to the first bracket cam being positioned in the closed position for abutting a tank neck positioned thereadjacent to facilitate movement of the tank neck of a cylindrical tank through the upper retaining opening into the upper retaining channel to facilitate securement thereof within the tank retaining zone. The first cam inner abutment surface and the first cam outer abutment surface will preferably intersect with respect to one another at the first protruding section and form at an acute angle therebetween. The bracket cam also includes a first cam stop adapted to abut the upper surrounding member responsive to the first bracket cam being moved to the closed position to prevent moving of the bracket cam beyond the closed position. It further includes a first cam handle extending outwardly therefrom and fixedly movable therewith to facilitate movement thereof manually. Preferably the first cam handle is oriented approximately perpendicularly with respect to the first cam inner abutment surface and the first cam outer abutment surface. The retaining means further includes a first cam resilient biasing means such as a coil spring or the like operatively mounted between the first bracket cam and the upper surrounding member for continuously urging the first bracket cam away from the opened position and toward the closed position thereof. This first cam resilient biasing member includes a first spacing member positioned between the upper surrounding member and the first bracket cam for providing spacing therebetween to facilitate placement of the first cam resilient biasing spring or the like therebetween. The first cam resilient biasing spring will preferably comprise a coil spring positioned extending around the spacing member which is attached to the upper surrounding member and the first bracket cam and is located physically therebetween for the purpose of continuously urging movement of the first bracket cam toward the closed position.

The retaining apparatus will further include a second bracket cam pivotally movably mounted to the upper surrounding member adjacent the upper retaining opening at a position spatially disposed from the first bracket cam with the upper retaining opening positioned therebetween. This second bracket cam will be pivotally movable to a closed position extending at least partially across the upper retaining opening to facilitate retaining of a neck of a cylindrical tank within the upper retaining channel. It is also pivotally movable to an opened position at least partially removed from a position extending across the upper retaining opening to allow movement of a tank neck through the upper retaining opening into or out of the upper retaining channel for facilitating replacement and removal thereof from the tank retaining zone. The first bracket cam and the second bracket cam will preferably be each independently pivotally movable with respect to the upper surrounding member.

The second bracket cam will include a second cam protruding section which is extendable into the upper retaining opening responsive to the second bracket cam being positioned in the closed position. This first cam protruding section and the second cam protruding section will be positionable extending across the upper retaining opening toward one another to a position spaced apart by a distance smaller than the normal size of the neck of a cylindrical tank to facilitate securement thereof selectively within the upper retaining channel responsive to the first bracket cam and the second bracket cam each being located in the closed position. The second bracket cam will further include a second cam inner abutment surface facing generally inwardly toward the upper retaining channel opening responsive to the second bracket cam being positioned in the closed position for the purpose of abutting a tank neck positioned therewithin to facilitate securement thereof within the tank retaining zone. The second bracket cam will also include a second cam outer abutment surface facing generally outwardly away from the upper retaining channel responsive to the second bracket cam being positioned in the closed position for abutting a tank neck of a cylindrical tank positioned thereagainst to facilitate movement of a cylindrical tank through the upper retaining opening into the upper retaining channel to facilitate securement thereof with respect to the tank receiving zone. The second cam inner abutment surface and the second cam outer abutment surface will preferably intersect with respect to one another at the location of the second protruding section and will be angularly oriented with respect to one another at an acute angle. The second bracket cam will further include a second cam stop which is adapted to abut the upper surrounding member responsive to the second bracket being moved to the closed position to prevent moving of the second cam beyond the closed position. A second cam handle will also be included on the second bracket cam which extends outwardly therefrom and is fixedly movable therewith to facilitate movement thereof by manual grasping such as by use of the thumb and forefinger of a user. The second cam handle will be oriented approximately perpendicularly with respect to the second cam inner abutment surface and the second cam outer abutment surface to facilitate grasping thereof. The first cam handle and the second cam handle will preferably extend approximately parallel with respect to one another and yet be spatially disposed from one another to facilitate simultaneous grasping thereof to cause movement of both the first and second bracket cam from the closed position to the opened position to facilitate removal of a tank from attachment to the bracket. This spacing between the first and second cam handles will preferably be less than five inches.

The retaining means further includes a second cam resilient biasing mechanism operative mounted between the second bracket cam and the upper surrounding member for continuously urging the second bracket cam away from the opened position and toward the closed position thereof. The second cam resilient biasing construction will include a second spacing member positioned between the upper surrounding member and the second bracket for providing spacing therebetween to facilitate placement of the second cam biasing mechanism therebetween. The second cam biasing construction will preferably comprise a second coil spring positioned extending around the second spacing member and being attached to the upper surrounding member and the second bracket cam and positioned therebetween such as to continuously urge movement of the second bracket cam toward the closed position.

In some embodiments of the present invention a tank resiliently flexible biasing mechanism will be fixedly mounted to the backing plate at a position above the lower surrounding member and below the upper surrounding member and extending outwardly into the tank retaining zone to resiliently bias a cylindrical tank positioned therein away from the backing plate and urge the tank neck thereof toward firm abutment with respect to the first and second cam inner abutment surfaces of the first and second bracket cams.

Also the apparatus of the present invention can include an auxiliary lower floor member pivotally movably mounted relative to the lower surrounding member at a position above the lower surrounding member floor surface and movable to a deployed position extending approximately perpendicularly outwardly from the backing plate extending across and above the lower surrounding member floor surface to support a cylindrical tank thereon positioned within the tank retaining zone at an elevated position closer to the upper surrounding member. The auxiliary lower floor member is also preferably movable to a storage position extending upwardly along the backing plate at a position such that it is no longer located within the tank receiving zone. An auxiliary floor retaining construction can be included for selectively retaining of the auxiliary floor in the storage position.

The present invention provides a bracket for retaining cylindrical tanks vertically upright which is particularly usable for oxygen tanks positioned in ambulances.

The present invention provides a bracket for retaining a cylindrical tank vertically upright wherein tanks having various neck sizes can be accommodated.

The present invention provides a bracket for retaining a cylindrical tank vertically upright wherein tanks having various overall longitudinal vertical lengths and shapes can be accommodated.

The present invention provides a bracket for retaining a cylindrical tank vertically upright which can be positioned immediately adjacent to similar constructions in a horizontal stack within an emergency vehicle because there are a minimal number of lateral protrusions because the lateral protrusions thereof are minimized.

The present invention provides a bracket for retaining a cylindrical tank vertically upright wherein placement of the tank into the tank retaining zone can be achieved merely by placing the lower portion of the tank in a lower retaining cavity and urging the upper portion of the tank inwardly while pivoting the bracket cams to the open position and simultaneously urging the upper portion of the tank into the U-shaped upper retaining channel.

The present invention provides a bracket for retaining a cylindrical tank vertically upright wherein the tank retaining zone extends from the cylindrical tank neck retaining portion in the upper retaining channel to the bottom tank retaining portion of the tank retaining zone in the lower retaining cavity of the lower surrounding member.

The present invention provides a bracket for retaining a cylindrical tank vertically upright wherein retaining panels extend vertically on opposite lateral sides of the backing plate which extend vertically therealong on lateral opposite sides of the tank retaining zone for facilitating overall structural strength and firm securement of the tank therewithin.

The present invention provides a bracket for retaining a cylindrical tank vertically upright wherein an auxiliary lower floor member is pivotally mounted with respect to the lower surrounding member to facilitate firm securement of tanks having variable vertical dimensions.

The present invention provides a bracket for retaining a cylindrical tank vertically upright wherein a resiliently flexible tank biasing means is included at an intermediate position between the lower surrounding member and the upper surrounding member to urge outwardly directed bias against the tank for firmly engaging of the tank when positioned within the tank retaining zone and to facilitate removal thereof from the tank retaining zone when the bracket cams are rotated to the opened position.

The present invention provides a bracket for retaining a cylindrical tank vertically upright wherein maintenance costs are minimized.

The present invention provides a bracket for retaining a cylindrical tank vertically upright wherein capital costs of manufacture are minimized.

The present invention provides a bracket for retaining a cylindrical tank vertically upright wherein mounting with respect to any readily available environmental structure is possible.

BRIEF DESCRIPTION OF THE DRAWINGS

While the invention is particularly pointed out and distinctly described herein, a preferred embodiment is set forth in the following detailed description which may be best understood when read in connection with the accompanying drawings, in which:

FIG. 10 is a lower perspective view of an embodiment of a first bracket cam of the present invention;

FIG. 11 is a front plan view of an embodiment of a first upper pivot pin enlarged washer of the present invention;

DETAILED DESCRIPTION OF THE PREFERRED EMBODIMENT

Figure 1:
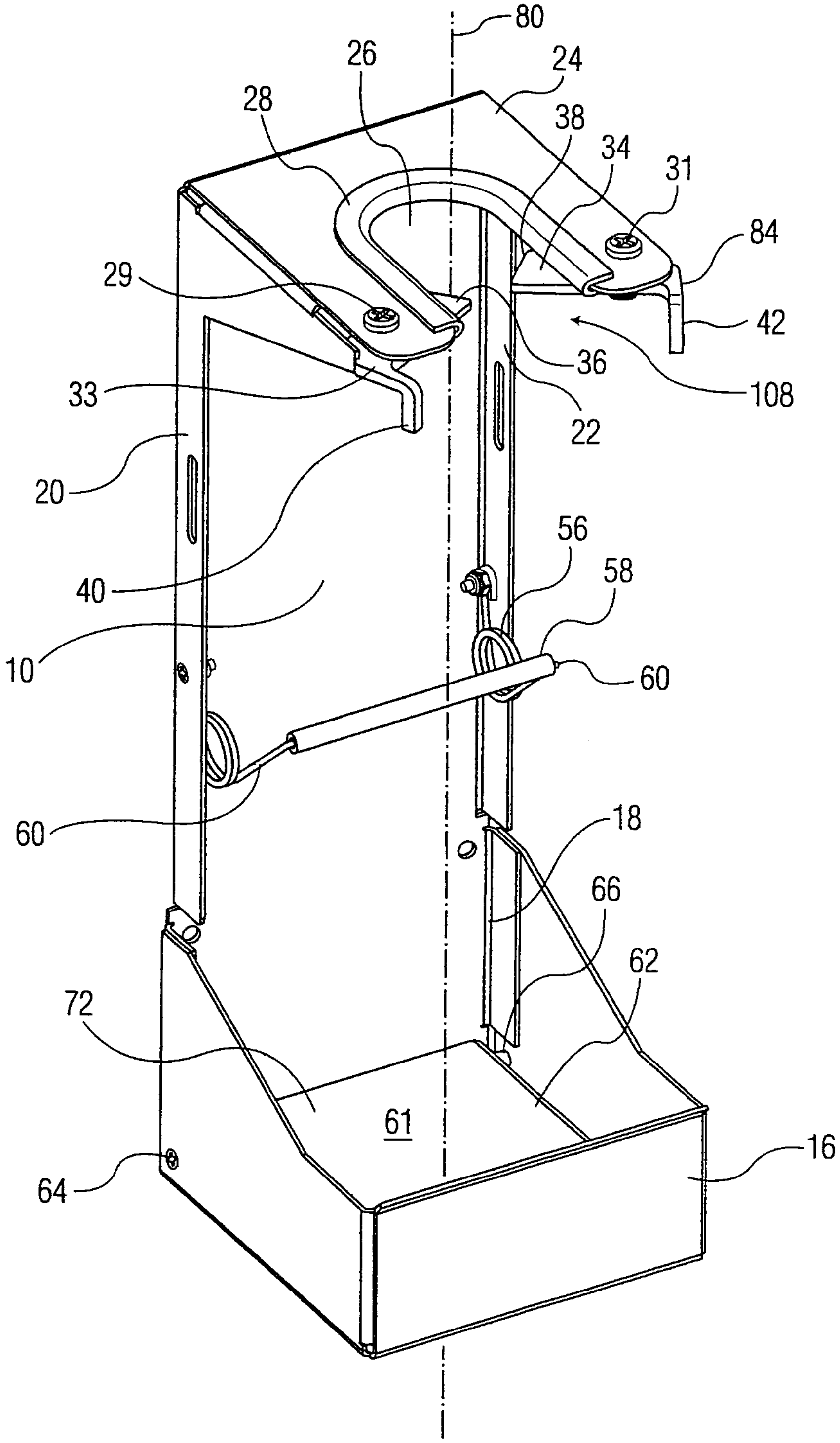
FIG. 1 is a front three-quarter perspective illustration of an embodiment of the bracket for retaining a cylindrical tank vertically upright taken from the front upper right shown without a tank positioned in the tank retaining zone and with the bracket cams in the retaining position and also with the auxiliary floor member in the deployed position.
Figure 2:
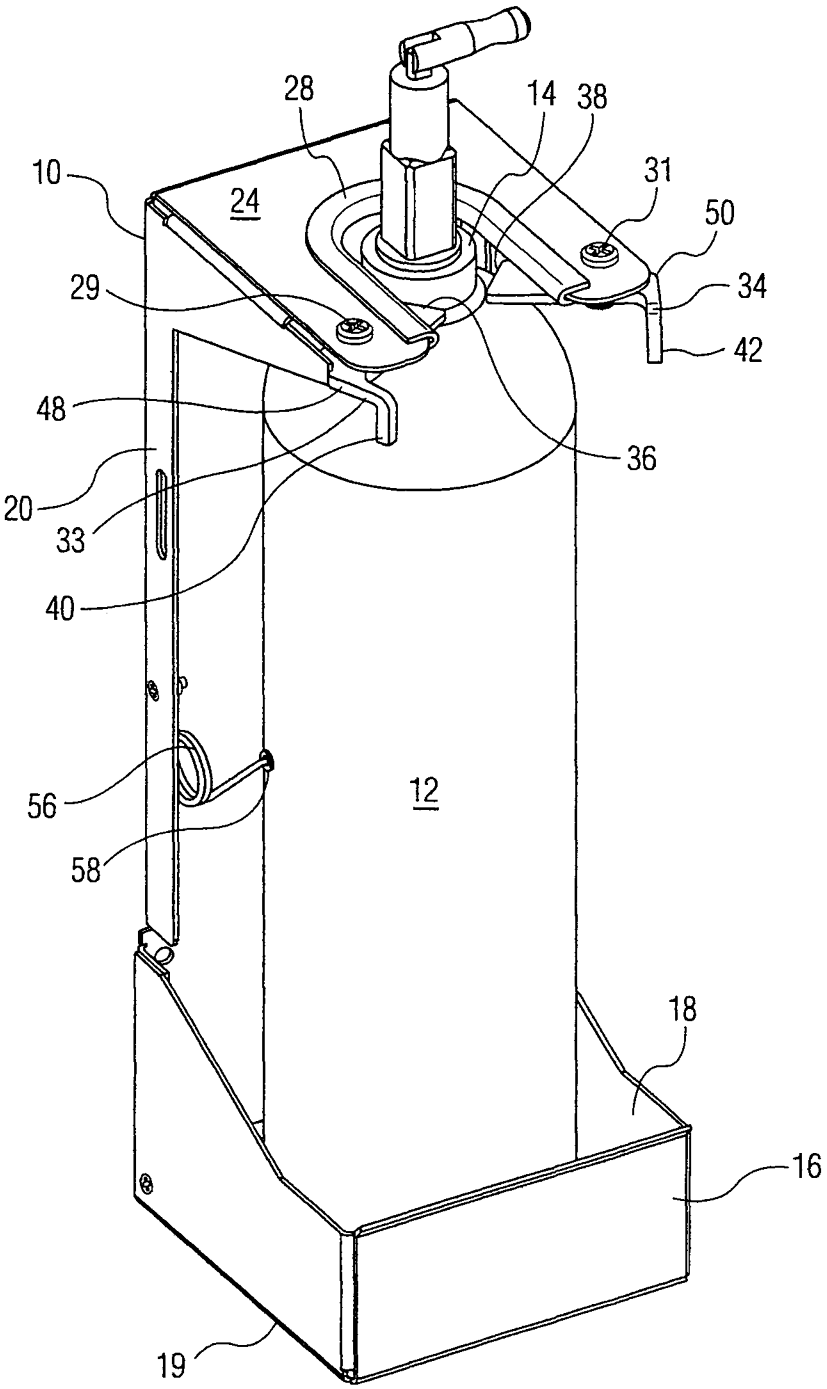
FIG. 2 is an illustration of the embodiment of the present invention shown in FIG. 1 with a cylindrical tank shown positioned within the tank retaining zone.

The present invention provides a bracket for retaining of a generally cylindrical tank 12 having an upper tank neck portion 14. It is important that the bracket of the present invention accommodates tanks having various lengths and having various different sizes in the tank neck section 14 thereof. It is also important that the tank be capable of being firmly secured with respect to the bracket in an easy, quick and efficient manner. It is also important that the tank be easily and quickly removable from securement within the bracket for the purposes of sudden emergency uses thereof.

The construction of the bracket includes a backing plate 10 which extends generally in a vertical direction and includes various apertures or brackets therealong for facilitating securing thereof with respect to surrounding environmental structure. As shown in this embodiment of the apparatus of the present invention the backing plate 10 can include side retaining panels extending vertically thereon. In particular, a first side retaining panel 20 is shown extending vertically along one lateral edge of the backing plate 10 and a second side retaining panel 22 oppositely positioned from the first side retaining panel 20 will extend vertically along the other side lateral outermost edge of the backing plate 10 to facilitate secure mounting to environmental structure. In the configuration shown in this embodiment of the present invention the retaining panels 20 and 22 include various apertures or slots therein which facilitate mounting thereof with respect to environmental structure or adjacently positioned similar brackets.

A lower surrounding member 16 is attached with respect to the lower surface of the backing plate 10 and defines a lower retaining cavity 18 therein with a lower surrounding member floor surface 19 defined within the cavity. The lower surrounding member 16 is adapted to receive a tank 12 by allowing the bottom of the tank to be rested upon the lower floor surface 19 to facilitate engagement of the tank relative to the bracket. The lower surrounding member 16 will surround the portion of the tank extending vertically immediately adjacent the lower surface thereof to facilitate engagement of the tank within the tank releasing zone 80 which extends vertically parallel to and outwardly displaced slightly from the backing plate 10.

An upper surrounding member 24 is positioned attached to the backing plate 10 preferably in the upper area thereof and is spatially disposed from the lower surrounding member 16 to define the tank retaining zone 80 extending therebetween. A retaining apparatus is mounted with respect to the upper surrounding member to selectively retain the tank with respect to the bracket and the backing plate 10. The upper surrounding member 24 will preferably define an upper retaining channel 26 which is preferably U-shaped and is adapted to receive the neck 14 of the tank 12 positioned therewith to facilitate retaining thereof. An upper retaining channel opening 108 is defined in the open end of U-shaped channel 26 most distant from backing plate 10 to facilitate moving of the neck 14 of a cylindrical tank 12 therethrough into channel 26.

Damage to the tank is preferably minimized by the inclusion of an upper channel edge guard 28 made of vinyl or some other soft material. Commonly the construction of the upper surrounding member 24 is metal and the construction of tank neck 14 is metal, or possibly ceramic, and therefore the inclusion of an upper channel edge guard 28 of vinyl or other soft material prevents damaging to both of these parts particularly preventing damaging to the tank neck.

A first bracket cam 33 and a second bracket cam 34 are included preferably pivotally moveably mounted with respect to the upper surrounding member 24 and are positioned on opposite sides of the upper retaining channel 26. These two bracket cams are each separately and independently pivotally movable between a closed or retaining position for holding of the tank neck 14 within the upper retaining slot 26 and a releasing position for allowing movement of the tank neck 14 into and out of the channel 26 for facilitating placement and removal, respectively, of the tank neck 14 relative to the retaining channel 26.

The pivotal movement of each of the bracket cams is facilitated by the inclusion of upper pivot pins 29 and 31. In particular, a first upper pivot pin 29 is positionable extending through the first upper surround aperture 86 defined in the upper surrounding member 24 adjacent to one side of the upper retaining channel 26 and spatially disposed from the backing plate 10. First upper pivot pin 29 is positioned extending through first upper surround aperture 86 and therebelow in order to provide an axis for facilitating pivotal movement of the first bracket cam 33 relative to the upper surrounding member 24 between the closed position and the opened position. First bracket cam 33 will define a first cam aperture 44 adapted to receive the first upper pivot pin 29 extending therethrough and to provide the pivotal axis for movement of the first bracket cam 33 between the closed position and the opened position. Control of movement of the first bracket cam 33 with respect to the upper surrounding member 24 is enhanced by the inclusion of a first upper pivot pin enlarged washer 30 or first washer 30. First washer 30 will receive the first upper pivot pin 29 extending therethrough and will be positioned thereon between the underside of the upper surrounding member 24 and the first bracket cam 33. Such positioning of the first washer 30 will assure that the proper spacing is maintained between the first bracket cam 33 and the upper surrounding member 24 in order to position a first cam resilient biasing means 52 therebetween. The larger or standard diameter portion of the washer will provide a first spacing member 114 to achieve this desired spacing. First cam resilient biasing means 52 is preferably a coil spring positioned surrounding the washer 30 which is connected to the upper surrounding member 24 and to the first bracket cam 33 to exert a resilient bias therebetween which urges the first bracket cam 33 to move toward the closed position. Thus, the steady state position of first bracket cam 33 will be in the closed position. First bracket cam 33 will include a first cam stop 48 thereon which will come into direct abutment with the upper surrounding member 24 responsive to movement to the closed position thereof. The first cam resilient biasing means 52 will urge rotational movement of the first bracket cam 33 in the clockwise direction as viewed from above until the first cam stop 48 comes into abutting contact with the upper surrounding member 24 which thusly defines the closed position thereof. At this closed position the first bracket cam 33 will extend at least partially across the upper retaining channel 26 to a position to prevent movement of a tank neck 14 through the upper retaining channel 26 of the upper surrounding member for movement thereof into or out of the tank retaining zone 80. Pivotal movement of the first bracket cam 33 in the counter-clockwise direction will cause movement thereof to the opened position. This counter-clockwise movement is performed by overpowering of the force exerted by the first cam resilient biasing means 52 and will cause movement of the first bracket cam 33 to the opened position such that movement of the tank neck 14 through the upper retaining channel 26 of the upper surrounding member for movement thereof into or out of the tank retaining zone 80 is made possible.

Similarly on the opposite side of the upper retaining channel 26, a second upper pivot pin 31 is positioned extending through a second upper surround aperture 88 defined in the upper surrounding member 24 adjacent to side of the upper retaining channel 26 opposite from the location of said first upper surround aperture 86 and spatially disposed from the backing plate 10. Second upper pivot pin 31 is positioned extending through the second upper surround aperture 88 and therebelow in order to provide an axis for facilitating pivotal movement of the second bracket cam 34 relative to the upper surrounding member 24 between the closed position and the opened position. Second bracket cam 34 will define a second cam aperture 44 adapted to receive the second upper pivot pin 31 extending therethrough and to provide the pivotal axis for movement of the second bracket cam 34 between the closed position and the opened position. Control of movement of the second bracket cam 34 with respect to the upper surrounding member 24 is enhanced by the inclusion of a second upper pivot pin enlarged washer 32 or first washer 32. First washer 32 will receive the second upper pivot pin 31 extending therethrough and will be positioned thereon between the underside of the upper surrounding member 24 and the second bracket cam 34. Such positioning of the washer 32 will assure that the proper spacing is maintained between the second bracket cam 34 and the upper surrounding member 24 in order to position a second cam resilient biasing means 54 therebetween. The larger diameter portion of the washer 32 will provide the second spacing member 116 as desired between the second cam bracket and the upper surrounding member 24. Second cam resilient biasing means 54 is preferably a coil spring positioned surrounding the washer 32 which is connected to the upper surrounding member 24 and to the second bracket cam 34 to exert a resilient bias therebetween which urges the second bracket cam 34 to move toward the closed position. Thus, the steady state position of second bracket cam 34 will be in the closed position. Second bracket cam 34 will include a second cam stop 50 thereon which will come into direct abutment with the upper surrounding member 24 responsive to movement to the closed position thereof. The second cam resilient biasing means 54 will urge rotational movement of the second bracket cam 34 in the counter-clockwise direction as viewed from above until the second cam stop 50 comes into abutting contact with the upper surrounding member 24 which thusly defines the closed position thereof. At this closed position the second bracket cam 34 will extend at least partially across the upper retaining channel 26 to a position to prevent movement of a tank neck 14 through the upper retaining channel 26 of the upper surrounding member for movement thereof into or out of the tank retaining zone 80. Pivotal movement of the second bracket cam 34 in the clockwise direction will cause movement thereof toward the opened position. This clockwise movement is performed by overpowering of the force exerted by the second cam resilient biasing means 54 and will cause movement of the second bracket cam 34 to the opened position such that movement of a tank neck 14 through the upper retaining channel 26 of the upper surrounding member for movement thereof into or out of the tank retaining zone 80 is made possible.

Figure 5:
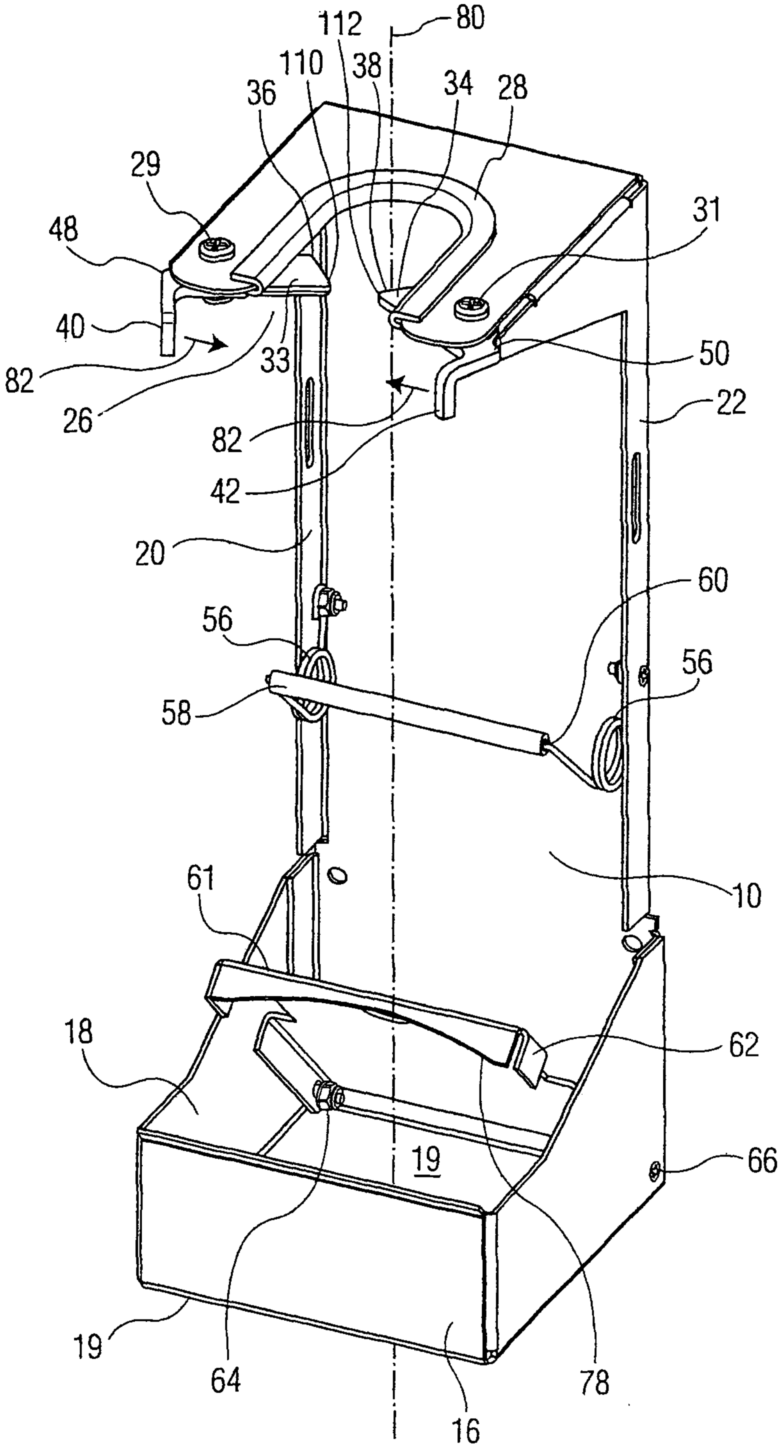
FIG. 5 is an illustration of the embodiment of the present invention as shown in FIG. 1 viewed in three-quarter front perspective from the upper left right with the auxiliary floor shown in an intermediate position between fully retained position and the fully deployed position.
Figure 6:
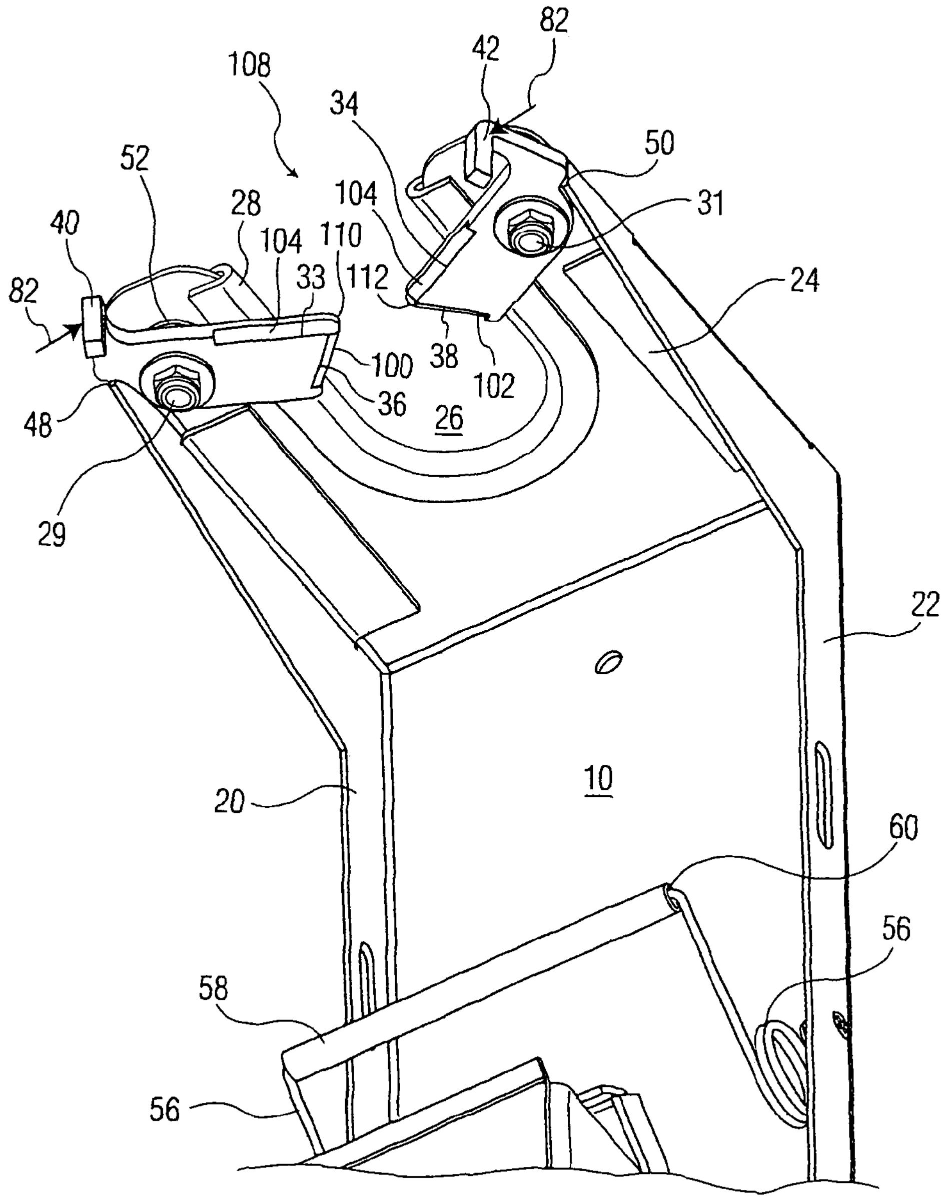
FIG. 6 is a close-up perspective view from below showing from beneath the upper surrounding member and the two bracket cams clearly showing the pivotal means for attachment thereof with the tank flexibly resilient biasing means shown in the lower portion thereof located in the steady state position extending outwardly away from the backing plate into the tank retaining zone.
Figure 7:
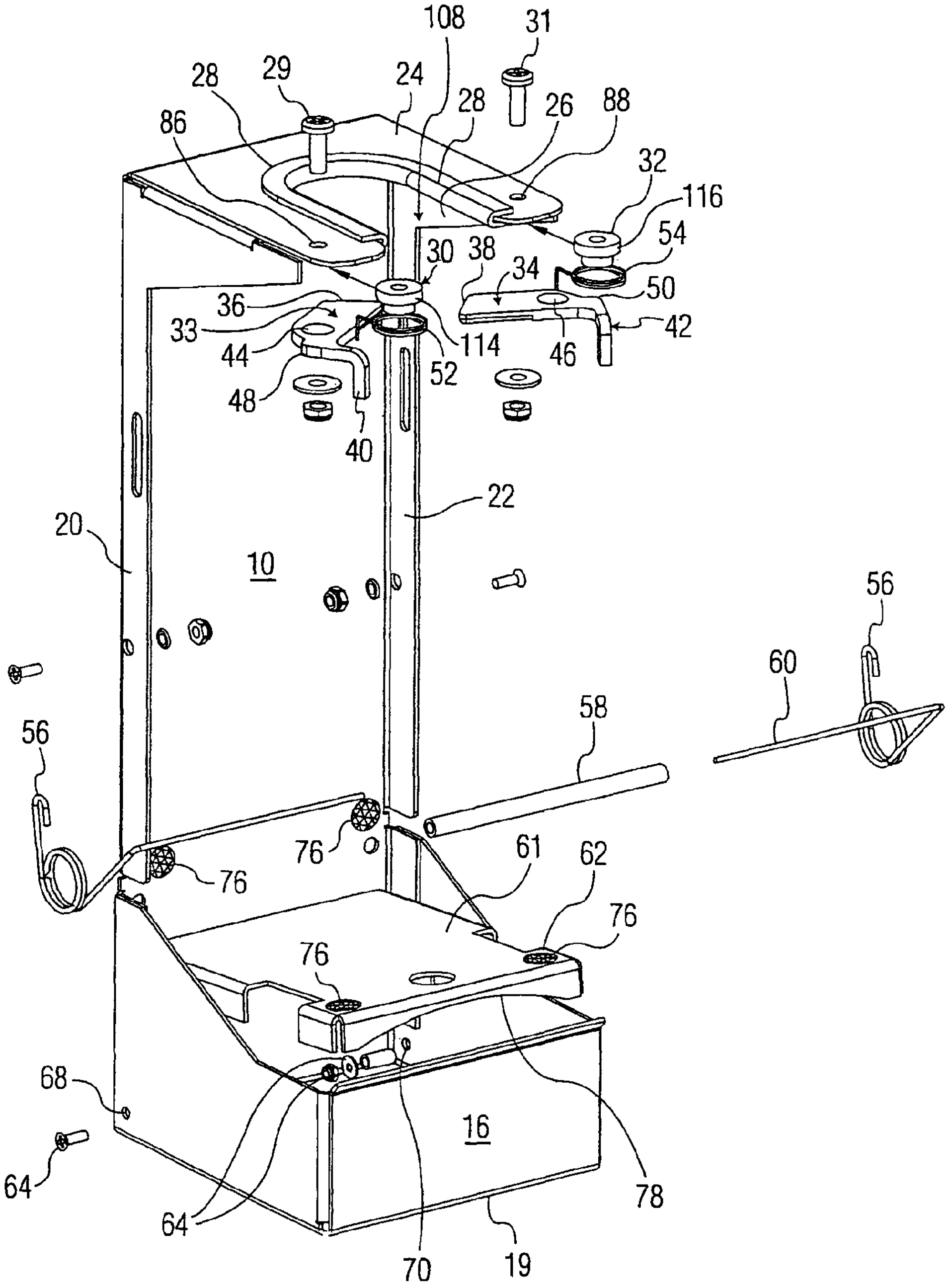
FIG. 7 is a perspective exploded illustration of the embodiment shown in FIG. 1 to illustrate the operative interaction of all parts to facilitate understanding of the manner of assembly and structural cooperation between parts.
Figure 8:
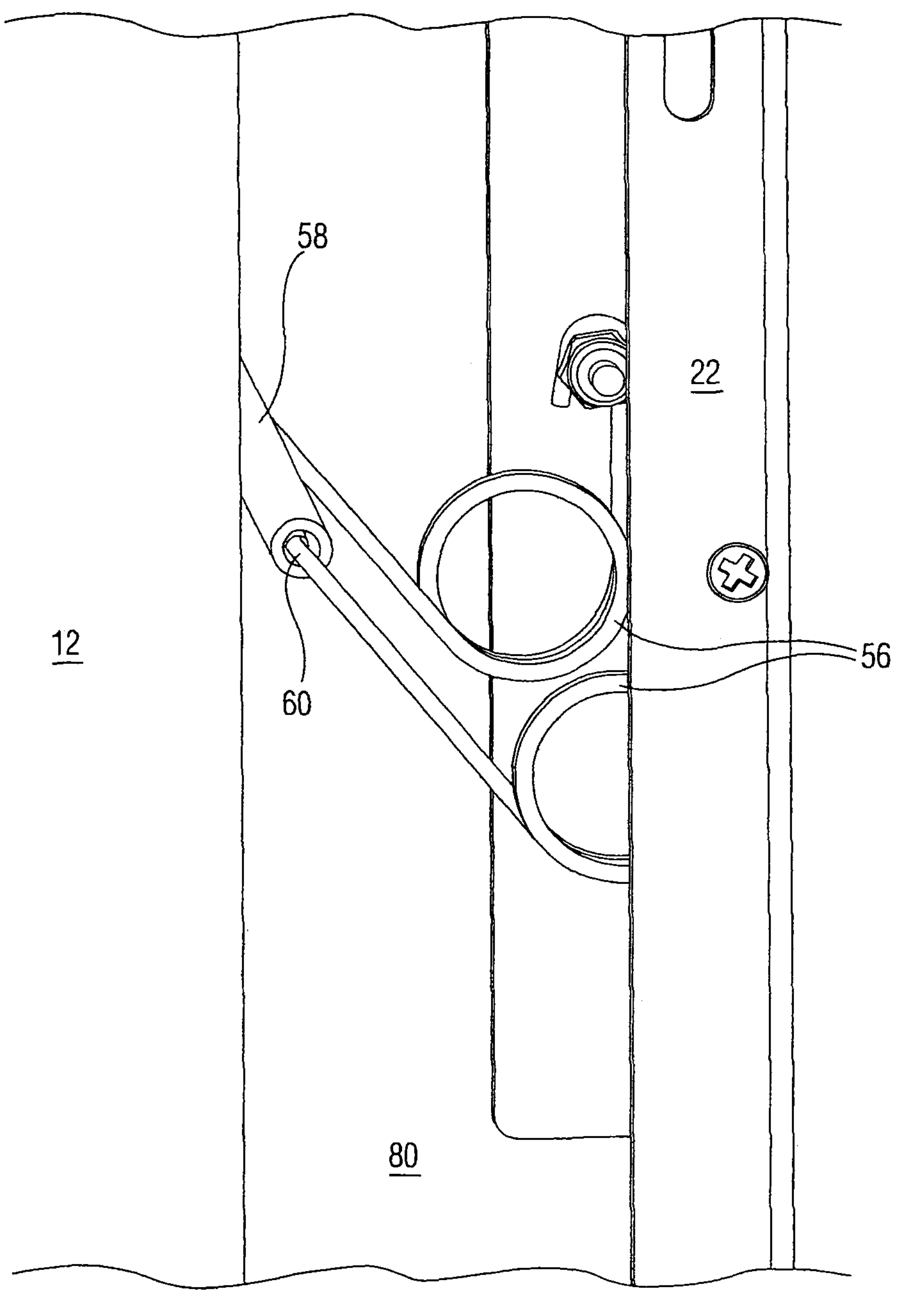
FIG. 8 is an exploded side view showing an embodiment of the tank flexibly resilient biasing means being resiliently compressed against the rear portion of a tank positioned within the tank retaining zone of the bracket of the present invention.
Figure 9:
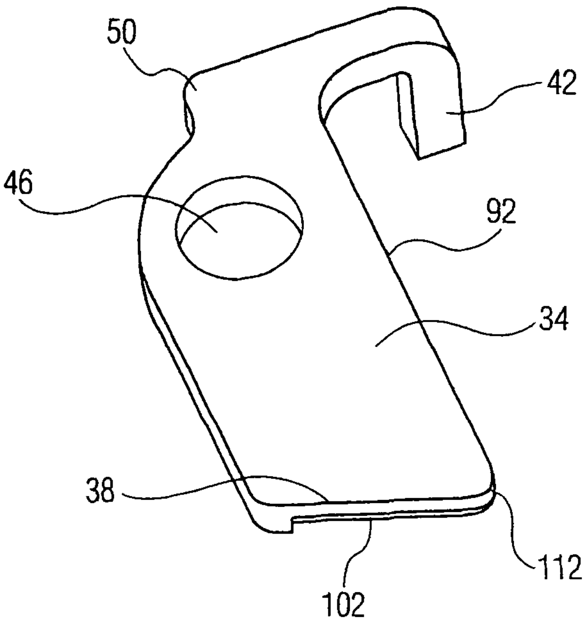
FIG. 9 is an upper perspective view of an embodiment of a second bracket cam of the present invention.
Figure 10:
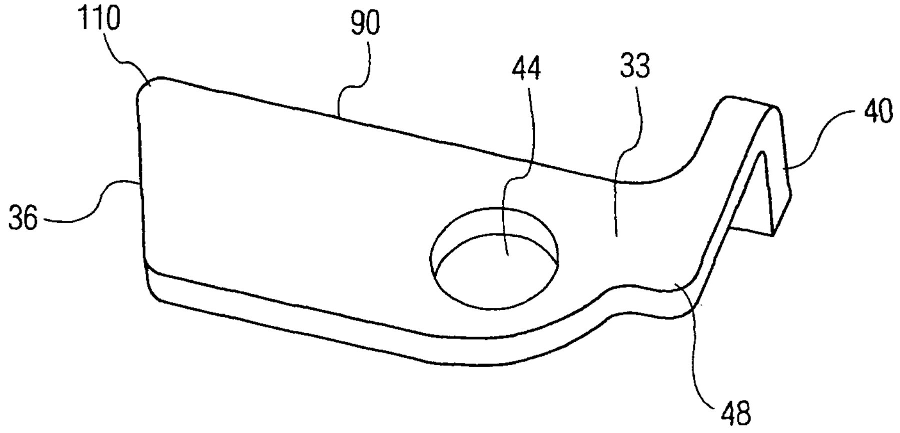
FIG. 10 is an upper perspective view of an embodiment of a first bracket cam of the present invention.
Figure 11:
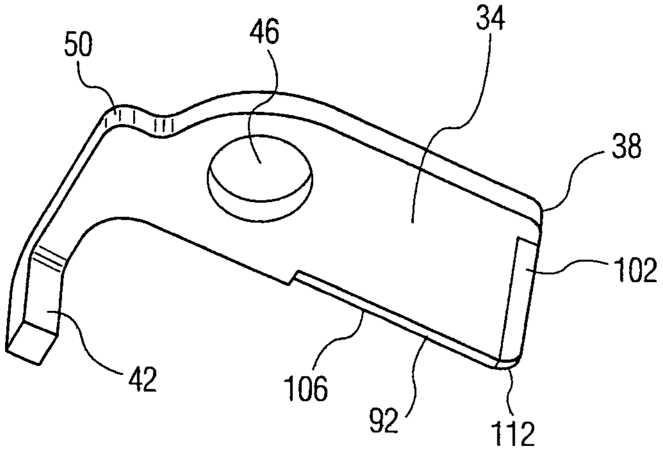
FIG. 11 is a lower perspective view of an embodiment of a second bracket cam of the present invention.
Figure 12:
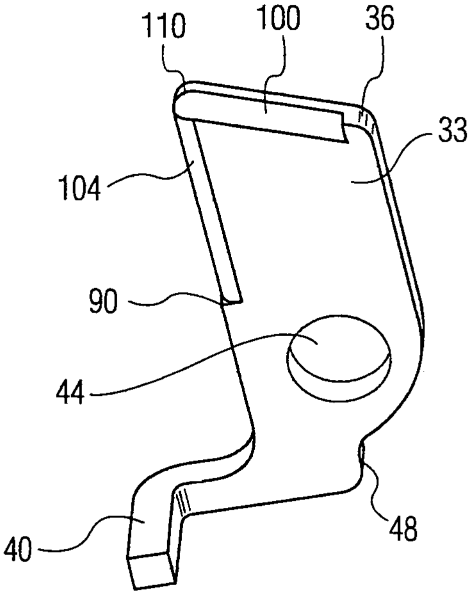
FIG. 12 is a front plan view of an embodiment of a second upper pivot pin enlarged washer of the present invention.
Figure 13:
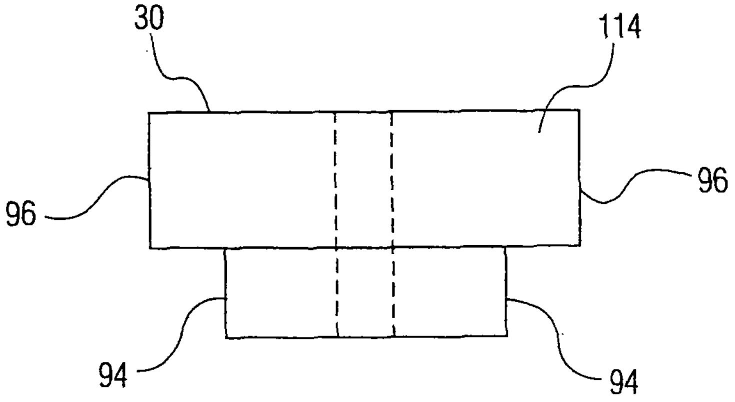
FIG. 13 is a front perspective illustration of an embodiment of a first spacing member of the present invention.
Figure 14:
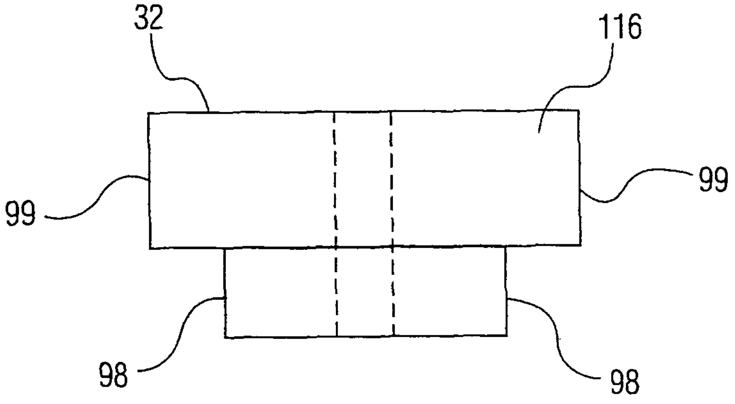
FIG. 14 is a front perspective illustration of an embodiment of the second spacing member of the present invention.

Pivotal movement of the first and second bracket cams 33 and 34 is facilitated by the inclusion of a first cam handle 40 and a second cam handle 42 defined extending outwardly therefrom, respectively. These two cam handles 40 and 42 are spatially disposed from one another at a convenient distance, such as less than five inches apart, in order to be capable of being grasped by the fingers of one hand of a user such that when compressed together in the direction shown by arrows 82 as shown in FIG. 5, movement of the first and second bracket cams 33 and 34 from the closed position to the releasing position is achieved to easily allow quick release of a tank 12 from the tank retaining zone 80.

It is important to appreciate that each of the bracket cams 33 and 34 are continuously urged by the respective resilient biasing means 52 and 54 toward the closed position to facilitate engagement thereof with respect to the tank neck 14 of a tank 12 when positioned within the tank retaining zone 80 for secure retaining thereof. With this construction the first bracket cam 33 and the second bracket cam 34 will define a first cam inner abutment surface 36 and a second cam inner abutment surface 38, respectively, which will be adapted to be brought into direct abutment with the tank neck 14 of a tank 12 which is positioned within the tank retaining zone 80 whenever the bracket cams 33 and 34 are allowed to be urged by the respective biasing means thereof 52 and 54 into the tank retaining position. First bracket cam 33 will also include a first cam protruding section 110 which is selectively extendable at least partially across the upper retaining channel opening 110 when in the closed position for securing of a tank 12 within the tank retaining zone 80. First cam protruding section 110 is defined preferably at the corner or intersection between said first cam inner abutment surface 36 and said first cam outer abutment surface 90. Second bracket cam 34 will similarly include a second cam protruding section 112 which is selectively extendable at least partially across the upper retaining channel opening 110 when in the closed position for securing of a tank 12 within the tank retaining zone 80. Second cam protruding section 112 is defined preferably at the corner or intersection between said second cam inner abutment surface 38 and said second cam outer abutment surface 92.

Thus, with this construction as defined above, when it is necessary the neck 14 of a tank 12 can easily be positioned within the upper retaining channel 26 for firm securement therewithin and also can be easily released therefrom. Ease of placement of a tank 12 into the bracket is also greatly facilitated by this construction. The first bracket cam 33 will define a first cam outer abutment surface 90 positioned oriented facing outwardly therefrom. When the first bracket cam 33 is in the closed position the first cam outer abutment surface 90 will face outwardly therefrom within the upper retaining channel 26. Similarly, the second bracket cam 34 will define a second cam outer abutment surface 92 positioned oriented facing outwardly therefrom. When the second bracket cam 34 is in the closed position the second cam outer abutment surface 92 will face outwardly therefrom within the upper retaining channel 26 at a position adjacent to the first cam outer abutment surface 90 of the first bracket cam 33. To move the tank 12 into position within the tank retaining zone 80 the lower portion of the tank 12 can be positioned within the lower retaining cavity 18 and the tank neck 14 can be pivoted into engaging abutment with respect to the first cam outer abutment surface 90 and the second cam outer abutment surface 92 simultaneously. Then the exertion of force against the tank neck 14 will overpower the force of the biasing means 52 and 54 cause both the first bracket cam 33 and the second bracket cam 34 to pivot away from the closed position to the opened position thereof. Then the tank neck 12 will be able to pass between the two bracket cams 33 and 34 through the upper retaining channel 26 to be retained in the tank retaining zone 80. After the tank moved to zone 80 the first and second bracket cams 33 and 34 will quickly pivot to the closed position thereby bringing the first cam inner abutment surface 36 and the second cam inner abutment surface 38 to securing abutting contact with the tank neck 12.

The construction of the bracket of the present invention is particularly enhanced by the use of a specific construction for the washers 30 and 32. Preferably first upper pivot pin enlarged washer 30 will include a first washer reduced diameter section 94 and a first washer standard diameter section 96. The central bore extending through washer 30 will be the same inside diameter in the first washer reduced diameter section 94 and in the first washer standard diameter section 98 such that the first upper pivot pin 29 extending therethrough will be snugly retained therein. Also the sizing of the first cam aperture 44 will be chosen large enough to receive the first washer reduced diameter section 94 of washer 30 therein to facilitate control of pivotal movement of first bracket cam 33 with respect to the upper surrounding member 24. The first washer standard diameter section 96 will be too large to fit within the first cam aperture 44 and thus will be positioned between the undersurface of the upper surrounding member 24 and the first bracket cam 33 to provide the spacing for mounting of the first coil spring 52 therearound.

Similarly the second upper pivot pin enlarged washer 32 will preferably include a second washer reduced diameter section 98 and a first washer standard diameter section 99. The central bore extending through washer 34 will be the same inside diameter in the second washer reduced diameter section 98 and in the second washer standard diameter section 99 such that the second upper pivot pin 31 extending therethrough will be snugly retained therein. Also the sizing of the second cam aperture 46 will be sized large enough to receive the second washer reduced diameter section 98 of washer 32 therein to facilitate control of pivotal movement of second bracket cam 34 with respect to the upper surrounding member 24. The second washer standard diameter section 99 will be too large to fit within the second cam aperture 46 and thus will be positioned between the undersurface of the upper surrounding member 24 and the second bracket cam 34 to provide the necessary spacing for mounting of the second coil spring 52 therearound.

Figure 3:
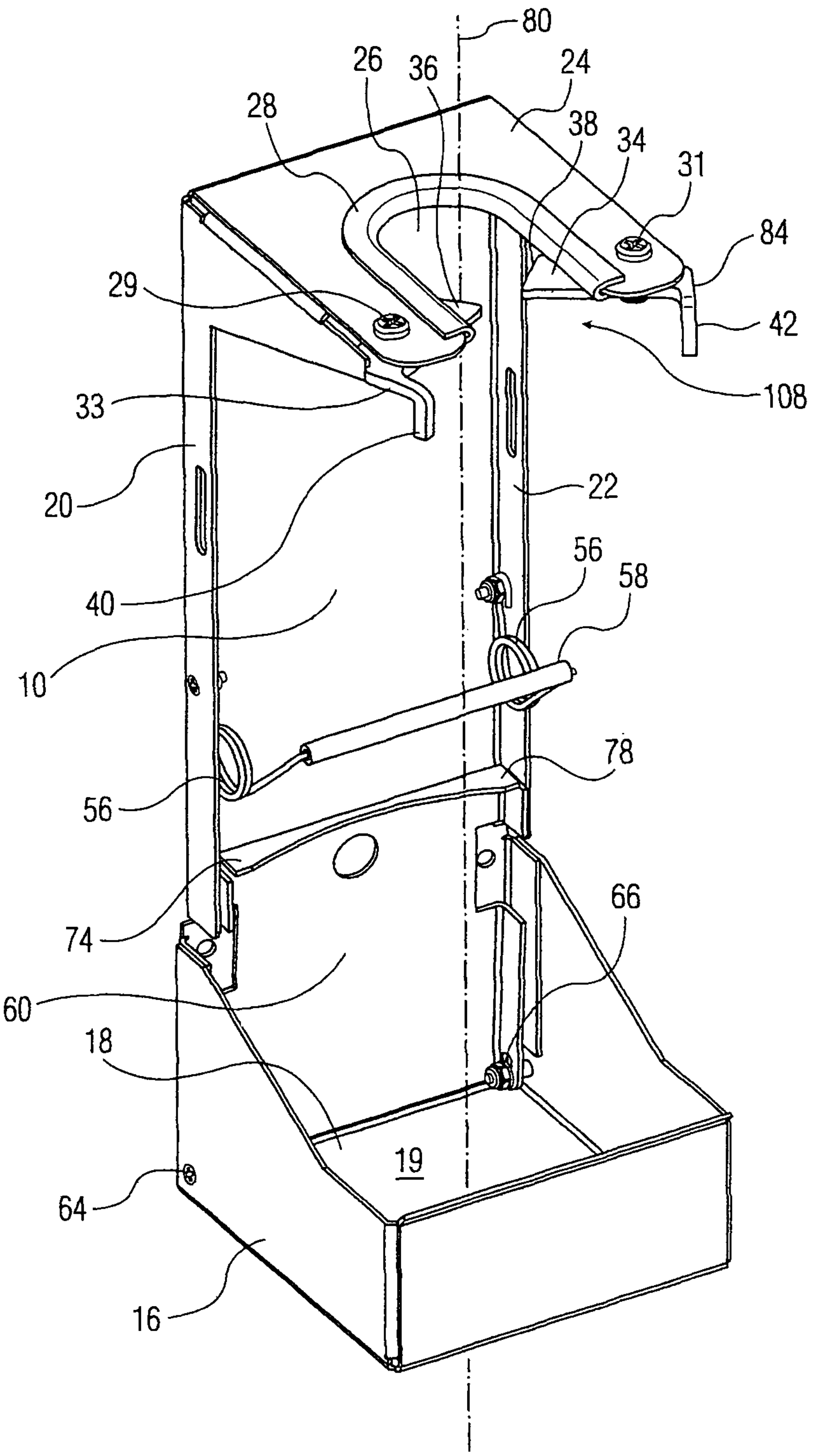
FIG. 3 is an illustration of the embodiment of the present invention as shown in FIG. 1 with the auxiliary floor shown retained in the upright position.
Figure 4:
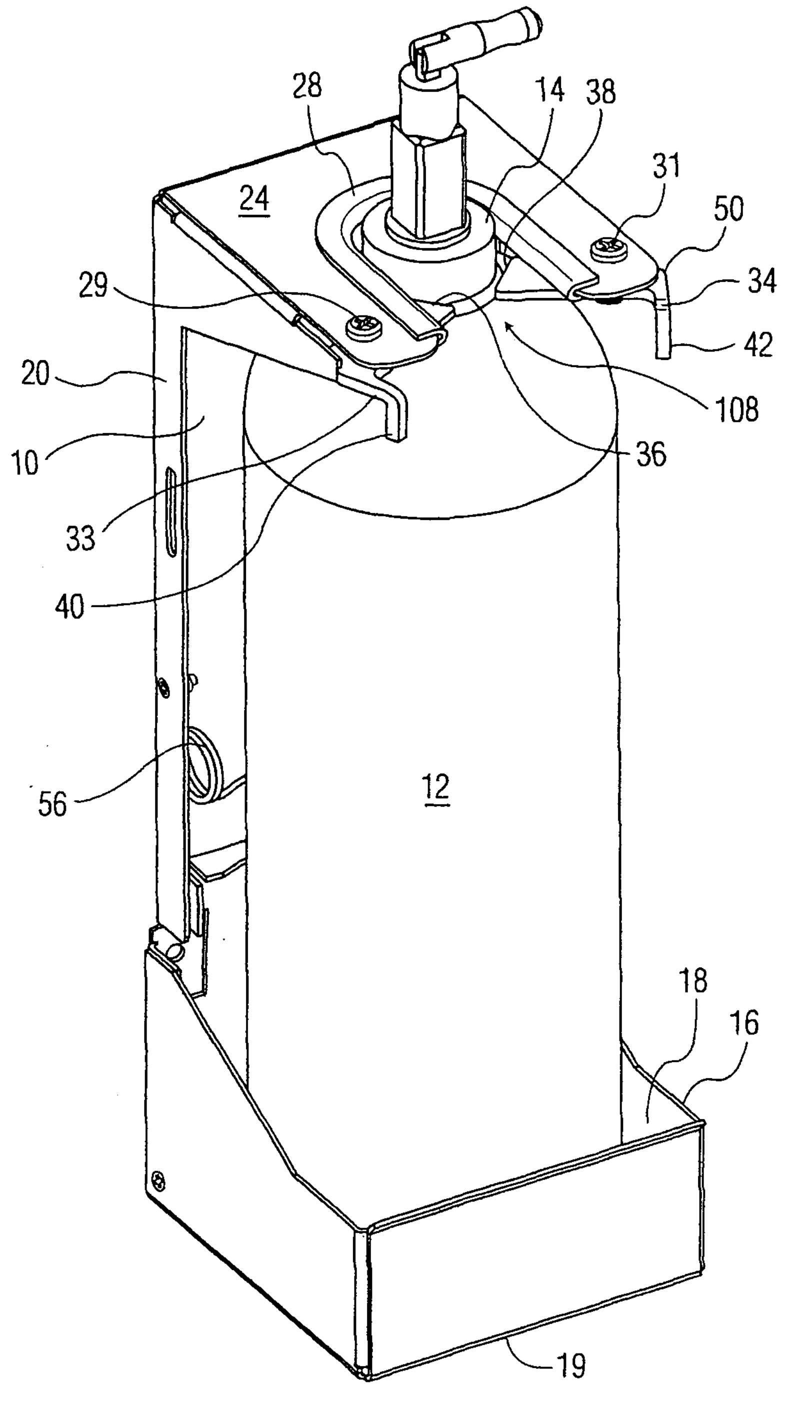
FIG. 4 is an illustration of the embodiment of the present invention as shown in FIG. 3 with a tank positioned in the tank retaining zone.

The lower surrounding member 16 of the present invention defines the lower floor surface 19 within the lower retaining cavity 18 at a specific predetermined distance from the upper retaining channel 26. The present invention provides a means for selectively decreasing this dimension by a small distance by the inclusion of an auxiliary lower floor member 62 which is pivotally movably mounted with respect to the lower surrounding member 16 and the backing plate 10 for usage or storage as needed. This auxiliary lower floor member 62 includes a lower auxiliary floor 61 such that when the floor member 62 is pivoted to the deployed position, as shown in FIG. 1, an elevated floor position will be provided to accommodate slightly shorter tanks or tanks with different profiles. The lower active position or deployed position 72 wherein the auxiliary lower floor member 62 is positioned generally horizontally is shown in FIG. 1. The storage or de-activated position for the lower floor member 62 is shown in FIG. 3 wherein the auxiliary lower floor member 62 is positioned in a generally vertically extending direction extending generally parallel to the backing plate. An auxiliary floor retaining means 76 such as a detachable hook and loop means or similar detachable securement means can be provided for detachably securing the auxiliary lower floor member 62 in the stored position temporarily when not being used. The pivotal movement of the auxiliary lower floor member 62 relative to the lower surrounding member 16 will be achieved by the inclusion of a first lower pivot member 64. and a second lower pivot member 66 positioned on opposite sides of the lower surrounding member 16. In particular, the lower surrounding member 16 will preferably define an auxiliary floor first aperture means 68 in the one side thereof and an auxiliary floor second aperture means 70 in the opposite side thereof to receive the first lower pivot member 64 and the second lower pivot member 66, respectively, therethrough to provide the pivoting axis for aiding in the pivotal movement of the auxiliary lower floor member 62 relative to the lower surrounding member 16. It should be appreciated that when the lower auxiliary floor member 62 is positioned in the vertical or stored position the lower floor front edge 78 thereof will extend inwardly toward the tank retaining zone 80 and thereby may be caused to come into engagement with respect to a tank 12 positioned therewithin. As such, it is important that the profile of the lower floor front edge 78 be arcuate with a recessed center portion to facilitate clearance within the tank retaining zone 80 for positioning of a tank 12 therewithin.

Another important construction shown in the bracket construction of the present invention is in the inclusion of a tank resiliently flexible biasing means 56 such as a flat spring or the like positioned at an intermediate location along the backing plate 10 between the lower surrounding member 16 and the upper surround member 24. This flexible biasing means 56 will be brought into abutment with the intermediate portion of a tank 12 positioned within the tank retaining zone 18 to urge the tank to move away from the backing plate 10 and thereby firmly secure the tank in position within the retaining zone 80. The flexible biasing means or spring 56 will cause the tank to move such that the tank neck 14 positively and firmly engages the first cam inner abutment surface 36 and the second cam inner abutment surface 38 of the bracket cams 33 and 34 thereby firmly securing the tank and minimizing rattling or movement thereof. A horizontally extending abutting section 60 of the flexibly resilient biasing means 56 will normally be capable of being brought into position immediately adjacent to the outer surface of the tank for exerting bias thereagainst from the biasing means 56. To protect the body of the tank a jacket means 58 of soft material such as rubber or the like can be included extending along the abutting section 60 which further facilitates urging of the tank 12 securely for retaining thereof in the tank retaining zone 80 and minimizing movement while held within the bracket.

To minimize damaging of tank 12 and particularly tank neck 14 thereof the edges of the abutment surface of the first and second bracket cams 33 and 34 will have arcuate edges. In particular, first cam inner abutment surface 36 will preferably include a first cam inner arcuate edge 100. Second cam inner abutment surface 38 will preferably include a second cam inner arcuate edge 102. Similarly, the first cam outer abutment surface 90 will include a first cam outer arcuate edge 104 and second cam outer abutment surface will include a second cam outer arcuate edge 106. Each of these four arcuate edges will facilitate in minimizing damage to the neck 14 or tanks 12 while in abutment therewith.

While particular embodiments of this invention have been shown in the drawings and described above, it will be apparent that many changes may be made in the form, arrangement and positioning of the various elements of the combination. In consideration thereof, it should be understood that preferred embodiments of this invention disclosed herein are intended to be illustrative only and not intended to limit the scope of the invention.

We claim:

1. A system for retaining a cylindrical tank vertically upright, said system being operative to retain the cylindrical tank in an orientation with the tank neck positioned extending upwardly above the cylindrical tank therebelow, said system comprising: a cylindrical tank including a tank neck protruding upwardly therefrom having a size smaller in diameter than the cylindrical tank therebelow; a bracket for retaining said cylindrical tank, said bracket comprising:

A. a backing plate extending generally vertically and being capable of mounting to adjacent environmental structure;

B. a lower surrounding member secured to said backing plate and extending outwardly therefrom and defining a lower retaining cavity therein which is adapted to receive and selectively retain a bottom of said cylindrical tank therewithin with the tank neck extending upwardly therefrom, said lower surrounding member defining a lower surrounding member floor surface to receive said cylindrical tank positioned thereupon;

C. an upper surrounding member secured to said backing plate and extending outwardly therefrom at a position spatially disposed upwardly from said lower surrounding member for retaining of said tank neck of said cylindrical tank therewithin with said cylindrical tank positioned within said lower retaining cavity therebelow, said upper surrounding member defining an upper retaining channel therein oriented facing outwardly therefrom in a direction away from said backing plate, said upper surrounding member further defining an upper retaining opening for facilitating said tank neck for entering into and exiting from said upper retaining channel and being located at a position spatially disposed from said backing plate, said lower surrounding member and said upper retaining channel of said upper surrounding member defined a tank retaining zone extending therebetween along said backing plate for selectively holding said cylindrical tank therewithin, said upper retaining channel being smaller than said lower retaining cavity to facilitate retaining of said cylindrical tank within said lower retaining cavity and to facilitate retaining of said tank neck within said upper retaining channel;

D. a retaining apparatus positioned adjacent said upper retaining opening and attached to said upper surrounding member for cooperating therewith to selectively retain said tank neck of a cylindrical tank within said upper retaining channel to facilitate selective retaining of said tank within said tank receiving zone, said retaining apparatus comprising:

(1) a first bracket cam pivotally moveably mounted to said upper surrounding member adjacent said upper retaining opening, said first bracket cam being pivotally movable to a closed position extending at least partially across said upper retaining opening to facilitate retaining of said tank neck within said upper retaining channel and being pivotally moveable to an opened position at least partially removed from said upper retaining opening to allow movement of said tank neck though said upper retaining opening into and out of said upper retaining channel for facilitating replacement and removal thereof from said tank retaining zone, said first bracket cam including;

(a) a first cam protruding section being extendable into said upper retaining opening responsive to said first bracket cam being positioned in said closed position;

(b) a first cam inner abutment surface facing generally inwardly toward said upper retaining channel responsive to said first bracket cam being positioned in said closed position for abutting said tank neck positioned therewithin to facilitate securement thereof within said tank retaining zone;

(c) a first cam outer abutment surface facing generally outwardly away from said upper retaining channel responsive to said first bracket cam being positioned in said closed position for abutting said tank neck positioned thereagainst to facilitate movement of said tank neck of cylindrical tank through said upper retaining opening into said upper retaining channel to facilitate securement thereof within said tank retaining zone;

(2) a first cam resilient biasing means operatively mounted between said first bracket cam and said upper surrounding member for continuously urging said first bracket cam away from said opened position and toward said closed position thereof;

(3) a second bracket cam pivotally moveably mounted to said upper surrounding member adjacent said upper retaining opening at a position spatially disposed from said first bracket cam with said upper retaining opening positioned therebetween, said second bracket cam being pivotally movable to a closed position extending at least partially across said upper retaining opening to facilitate retaining of said tank neck of said cylindrical tank within said upper retaining channel and being pivotally moveable to an opened position at least partially removed from said upper retaining opening to allow movement of said tank neck through said upper retaining opening into and out of said upper retaining channel for facilitating replacement and removal thereof from said tank retaining zone, said second bracket cam including;

(a) a second cam protruding section being extendable into said upper retaining opening responsive to said second bracket cam being positioned in said closed position;

(b) a second cam inner abutment surface facing generally inwardly toward said upper retaining channel opening responsive to said second bracket cam being positioned in said closed position for abutting said tank neck positioned therewithin to facilitate securement thereof within said tank retaining zone;

(c) a second cam outer abutment surface facing generally outwardly away from said upper retaining channel responsive to said second bracket cam being positioned in said closed position for abutting said tank neck of said cylindrical tank positioned thereagainst to facilitate movement of said cylindrical tank through said upper retaining opening into said upper retaining channel to facilitate securement thereof within said tank retaining zone; and (4) a second cam resilient biasing means operatively mounted between said second bracket cam and said upper surrounding member for continuously urging said second bracket cam away from said opened position and toward said closed position thereof.

2. A system for retaining a cylindrical tank vertically upright, said system being operative to retain the cylindrical tank in an orientation with the tank neck positioned extending upwardly above the cylindrical tank therebelow, said system as defined in claim 1 wherein said first cam protruding section and said second cam protruding section are positionable extending across said upper retaining opening toward one another to a position spaced apart by a distance smaller than the size of said tank neck of said cylindrical tank to facilitate securement thereof selectively within said upper retaining channel responsive to said first bracket cam and said second bracket cam each being in said closed position.

3. A system for retaining a cylindrical tank vertically upright, said system being operative to retain the cylindrical tank in an orientation with the tank neck positioned extending upwardly above the cylindrical tank therebelow, said system as defined in claim 1 wherein said first cam inner abutment surface and said first cam outer abutment surface intersect with respect to one another at said first protruding section and wherein said second cam inner abutment surface and said second cam outer abutment surface intersect with respect to one another at said second protruding section.

4. A system for retaining a cylindrical tank vertically upright, said system being operative to retain the cylindrical tank in an orientation with the tank neck positioned extending upwardly above the cylindrical tank therebelow, said system as defined in claim 1 wherein said first cam inner abutment surface and said first cam outer abutment surface are angularly oriented with respect to one another at an angle of less than ninety , degrees and wherein said second cam inner abutment surface and said second cam outer abutment surface are angularly oriented with respect to one another at an angle of less than ninety degrees.

5. A system for retaining a cylindrical tank vertically upright, said system being operative to retain the cylindrical tank in an orientation with the tank neck positioned extending upwardly above the cylindrical tank therebelow, said system as defined in claim 1 wherein said retaining apparatus further includes a first spacing member positioned between said upper surrounding member and said first bracket cam for providing spacing therebetween to facilitate placement of said first cam resilient biasing means therebetween and a second spacing member positioned between said upper surrounding member and said second bracket cam for providing spacing therebetween to facilitate placement of said second cam resilient biasing means therebetween.

6. A system for retaining a cylindrical tank vertically upright, said system being operative to retain the cylindrical tank in an orientation with the tank neck positioned extending upwardly above the cylindrical tank therebelow, said system as defined in claim 5 wherein said first cam resilient biasing means comprises a first coil spring positioned extending around said first spacing member and being attached to said upper surrounding member and said first bracket cam and positioned therebetween for continuously urging movement of said first bracket cam toward said closed position and wherein said second cam resilient biasing means comprises a second coil spring positioned extending around said second spacing member and being attached to said upper surrounding member and said second bracket cam and positioned therebetween for continuously urging movement of said second bracket cam toward said closed position.

7. A system for retaining a cylindrical tank vertically upright, said system being operative to retain the cylindrical tank in an orientation with the tank neck positioned extending upwardly above the cylindrical tank therebelow, said system as defined in claim 1 wherein said first outer abutment surface and said second outer abutment surface are orientated at an oblique angle with respect to one another extending partially across said upper retaining opening responsive to said first bracket cam and said second bracket cam both being in the closed position to facilitate the placement of said tank neck of said cylindrical tank thereagainst with sufficient force to compress said first cam resilient biasing means and said second cam resilient biasing means to urge said first bracket cam and said second bracket cam to move to the opened position to facilitate movement of said tank neck through said upper retaining opening into said tank retaining zone defined within said upper retaining channel.

8. A system for retaining a cylindrical tank vertically upright, said system being operative to retain the cylindrical tank in an orientation with the tank neck positioned extending upwardly above the cylindrical tank therebelow, said system as defined in claim 1 wherein said first bracket cam further includes a first cam stop thereon pivotally moveable therewith and adapted to abut said upper surrounding member responsive to said first bracket cam being moved to said closed position to prevent said first cam resilient biasing from moving said first bracket cam beyond said closed position and wherein said second bracket cam further includes a second cam stop thereon pivotally moveable therewith and adapted to abut said upper surrounding member responsive to said second bracket cam being moved to said closed position to prevent said second cam resilient biasing from moving said second bracket cam beyond said closed position.

9. A system for retaining a cylindrical tank vertically upright, said system being operative to retain the cylindrical tank in an orientation with the tank neck positioned extending upwardly above the cylindrical tank therebelow, said system as defined in claim 1 wherein said first bracket cam further includes a first cam handle extending outwardly therefrom and being fixedly movable therewith and wherein said second bracket cam further includes a second cam handle extending outwardly therefrom and being fixedly movable therewith, said first cam handle facilitating manual moving of said first bracket cam to pivot from said closed position to said opened position and said second cam handle facilitating manual moving of said second bracket cam to pivot from said closed position to said opened position to facilitate removal of said neck of said cylindrical tank through said upper retaining opening for allowing exiting thereof from said tank retaining zone defined within said upper retaining channel of said upper surrounding member.

10. A system for retaining a cylindrical tank vertically upright, said system being operative to retain the cylindrical tank in an orientation with the tank neck positioned extending upwardly above the cylindrical tank therebelow, said system as defined in claim 9 wherein said first cam handle is oriented approximately perpendicularly with respect to said first cam inner abutment surface and said first cam outer abutment surface and wherein said second cam handle is oriented approximately perpendicularly with respect to said second cam inner abutment surface and said second cam outer abutment surface to facilitate grasping thereof.

11. A system for retaining a cylindrical tank vertically upright, said system being operative to retain the cylindrical tank in an orientation with the tank neck positioned extending upwardly above the cylindrical tank therebelow, said system as defined in claim 10 wherein said first cam handle and said second cam handle extend approximately parallel with respect to one another and spatially disposed from one another to facilitate simultaneous grasping thereof for simultaneously urging movement of said first bracket cam and said second bracket cam to move from said closed position to said opened position.

12. A system for retaining a cylindrical tank vertically upright, said system being operative to retain the cylindrical tank in an orientation with the tank neck positioned extending upwardly above the cylindrical tank therebelow, said system as defined in claim 11 wherein said first cam handle and said second cam handle are spatially disposed from one another by less than five inches responsive to said first cam bracket and said second cam bracket being in the closed position to facilitate grasping thereof simultaneously by an operator using only one hand to facilitate urging movement of said first bracket cam and said second bracket cam from the closed position to the opened position simultaneously manually.

13. A system for retaining a cylindrical tank vertically upright, said system being operative to retain the cylindrical tank in an orientation with the tank neck positioned extending upwardly above the cylindrical tank therebelow, said system as defined in claim 5 wherein said upper surrounding member defines therein a first upper surround aperture and a second upper surround aperture spatially disposed from one another on Opposites sides of said upper retaining channel adjacent said first upper surround aperture, and wherein said retaining apparatus includes a first upper pivot pin positioned extending through said first upper surround aperture and a second upper pivot pin extending through said second upper surround aperture, said first bracket cam being pivotally mounted with respect to said first upper pivot pin to facilitate pivotally moveable mounting thereof with respect to said upper surrounding member and second bracket cam being pivotally mounted with respect to said second upper pivot pin to facilitate pivotally moveable mounting thereof with respect to said upper surrounding member.

14. A system for retaining a cylindrical tank vertically upright, said system operative to retain the cylindrical tank in an orientation with the tank neck positioned extending upwardly above the cylindrical tank therebelow, said system as defined in claim 13 wherein said first bracket cam defines a first cam aperture extending therethrough and wherein said second bracket cam defines a second cam aperture extending therethrough, said retaining apparatus including a first washer positioned mounted on said first upper pivot pin between said first bracket cam and said upper surrounding member, said first washer including a first washer standard diameter section and a first washer reduced diameter section, said first washer standard diameter section defining said first spacing member and said first washer reduced diameter section being adapted to extend into said first cam aperture to facilitate pivotal movement of said first bracket cam with respect to said upper surrounding member, said retaining apparatus also including a second washer positioned mounted on said second upper pivot pin between said second bracket cam and said upper surrounding member, said second washer including a second washer standard diameter section and a second washer reduced diameter section, said second Washer standard diameter section defining said second spacing member and said second washer reduced diameter section being adapted to extend into said second cam aperture to facilitate pivotal movement of said second bracket cam with respect to said upper surrounding member.

15. A system for retaining a cylindrical tank vertically upright, said system being operative to retain the cylindrical tank in an orientation with the tank neck positioned extending upwardly above the cylindrical tank therebelow, said system as defined in claim 1 wherein said first bracket cam and said second bracket cam are each independently pivotally moveable with respect to said upper surrounding member.

16. A system for retaining a cylindrical tank vertically upright, said system being operative to retain the cylindrical tank in an orientation with the tank neck positioned extending upwardly above the cylindrical tank therebelow, said system as defined in claim 1 further comprising a tank resiliently flexible biasing means fixedly mounted to said backing plate at a position above said lower surrounding member and below said upper surrounding member and extending outwardly into said tank retaining zone to resiliently bias said cylindrical tank positioned therein away from said backing plate and urge said tank neck thereof toward said first cam inner abutment surface and said second cam inner abutment surface to facilitating securement thereof selectively with respect thereto.

17. A system for retaining a cylindrical tank vertically upright, said system being operative to retain the cylindrical tank in an orientation with the tank neck positioned extending upwardly above the cylindrical tank therebelow, said system as defined in claim 1 and further comprising an auxiliary lower floor member pivotally moveable mounted relative to said lower surrounding member at a position above said lower surrounding member floor surface and moveably to a deployed position extending approximately perpendicularly outwardly from said backing plate extending across and above said lower surrounding member floor surface to support said cylindrical tank thereon positioned within said tank retaining zone at an elevation position closer to said upper surrounding member, said auxiliary lower floor member also being moveable to a storage position extending upwardly along said backing plate at a position outside of said tank retaining zone.

18. A system for retaining a cylindrical tank vertically upright, said system being operative to retain the cylindrical tank in an orientation with the tank neck positioned extending upwardly above the cylindrical tank therebelow, said system as defined in claim 17 further comprising an auxiliary floor retaining means positioned between said backing plate and said auxiliary floor member for selectively retaining thereof in the storage position.

* * * * *